United States Patent
Iyer et al.

(10) Patent No.: US 10,382,253 B2
(45) Date of Patent: Aug. 13, 2019

(54) METHOD AND SYSTEM FOR NETWORK PERFORMANCE ROOT CAUSE ANALYSIS

(71) Applicant: NOKIA SOLUTIONS AND NETWORKS OY, Espoo (FI)

(72) Inventors: Krishnan Iyer, Dunwoody, GA (US); Ajay Joshi, Irvin, TX (US); Yunfei Bai, Sammamish, WA (US); Phy Son Nguyen, Carrollton, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 141 days.

(21) Appl. No.: 15/523,607

(22) PCT Filed: Oct. 30, 2014

(86) PCT No.: PCT/US2014/063083
§ 371 (c)(1),
(2) Date: May 1, 2017

(87) PCT Pub. No.: WO2016/068926
PCT Pub. Date: May 6, 2016

(65) Prior Publication Data
US 2017/0331673 A1    Nov. 16, 2017

(51) Int. Cl.
*G06F 11/00* (2006.01)
*H04L 12/24* (2006.01)
*G06N 20/00* (2019.01)

(52) U.S. Cl.
CPC ........... *H04L 41/065* (2013.01); *G06N 20/00* (2019.01); *H04L 41/04* (2013.01); *H04L 41/0631* (2013.01); *H04L 41/16* (2013.01)

(58) Field of Classification Search
CPC ...................................................... H04L 41/065
USPC .......................... 714/37, 4.1, 4.21, 6.31, 26
See application file for complete search history.

(56) References Cited

U.S. PATENT DOCUMENTS

| | | | | |
|---|---|---|---|---|
| 9,317,269 | B2* | 4/2016 | Kimmet | G06F 8/61 |
| 2002/0083371 | A1* | 6/2002 | Ramanathan | G06F 11/2294 714/37 |
| 2004/0163079 | A1* | 8/2004 | Noy | G06F 11/3409 717/154 |
| 2012/0054554 | A1* | 3/2012 | Dagan | G06F 11/0712 714/39 |
| 2013/0346161 | A1* | 12/2013 | Mayerle | G06Q 10/06 705/7.39 |
| 2014/0129876 | A1* | 5/2014 | Addepalli | H04L 41/064 714/37 |

OTHER PUBLICATIONS

International Search Report and Written Opinion dated Jan. 23, 2015, corresponding to International Patent Application No. PCT/US2014/063083.

(Continued)

*Primary Examiner* — Dieu Minh T Le
(74) *Attorney, Agent, or Firm* — Squire Patton Boggs (US) LLP

(57) ABSTRACT

A system in a telecommunications network includes a database including at least one metric, at least one module configured for analyzing the at least one metric, a graphical user interface configured for displaying the at least one module, and a processor configured for determining a root cause in the network.

17 Claims, 7 Drawing Sheets

(56) References Cited

OTHER PUBLICATIONS

Saeed Salah et al A model-based survey of alert correlation techniques; Apr. 30, 2013 chapter 3.7; 4.3.2.6; 4.3.3.4; 5.2.1.
Boit C. et al Managing the Unpredictable: A Business Nodel for Failure Analysis Service;Nov. 16, 2011 pp. 578-587; chapter "Metrics and Target Setting" on pp. 580, 581 figure 2.

* cited by examiner

METHOD AND SYSTEM FOR NETWORK PERFORMANCE ROOT CAUSE ANALYSIS

FIELD OF TECHNOLOGY

This disclosure relates generally to the field of telecommunications networks, and more particularly to a method and system for monitoring and analyzing network performance.

BACKGROUND

Performance metrics are generally defined to measure and monitor the health of the telecommunication network's performance. Generally, engineering/operation departments within the company focus their energy and efforts on analyzing defined performance metrics and triggering appropriate actions to maintain or improve the metrics being analyzed. This process typically originates with defining key performance indicators (KPI), which the engineers/operators use in a Root Cause Analysis (RCA) for eventually enabling actions to optimize network performance.

Currently, such RCA based on performance data and KPI are manual processes performed by experienced engineers, wherein the KPI are broken down into components and a correlation analysis is applied thereto, for identifying the root cause of a network issue. For example, data from various network elements (i.e., eNB, MME, RNC) is gathered in data warehouses and aggregated at different hierarchical levels (i.e., cell, market, region, national) and different time periods (i.e., hourly, daily). Engineers then manually query the data warehouse based on analytical needs by creating custom or pre-defined queries using the front end or a graphical user interface (GUI). The engineers typically utilize reporting tools to generate KPI reports and analyze the data, which may lead to additional analysis until the end goal of the analysis, a root cause, is reached. Such an analysis is extremely time consuming and inefficient, as it can take the engineers several days to perform the analysis.

With the enormous growth in the telecom industry and the emergence of Big Data, analytic engines have been developed to increase the efficiency of existing manual network analysis processes. These engines can process large amounts of data to assess network health, perform trouble shooting, predict network demands and manage customer needs, for example. However, limitations exist in these analytics engines. These engines still require manual steps, which as indicated above, are both time and cost inefficient. In addition, the methodology utilized in these engines is not consistent and systematic, as the skill level of the engineers/operators conducting the analysis can vary greatly. These engines also sometimes require repetition of the manual process, which again reduces the time efficiency of the analysis, because past experiences/learning are not captured for future use.

SUMMARY

A system in a telecommunications network includes a database including at least one metric, at least one module configured for analyzing the at least one metric, a graphical user interface configured for displaying the at least one module, and a processor configured for determining a root cause in the network.

A method in a telecommunications network includes defining, in a database, at least one metric, selecting at least one metric from the database, applying at least one module to the selected metric, and generating, from a processor, a root cause in the network.

A method in a telecommunications network having a processor includes selecting a metric from a metric repository, identifying components of the selected metric, applying at least one module to the components of the selected metric, storing data from the at least one module in a memory of the processor, generating, at the processor, a root cause based on the stored data.

DESCRIPTION OF THE SEVERAL VIEWS OF THE DRAWINGS

To aid in the proper understanding of the present disclosure, reference should be made to the accompanying drawings, wherein.

DETAILED DESCRIPTION

The present disclosure provides a system and method for analyzing performance metrics in a telecommunications network. Existing performance analysis systems are typically manual in nature, and are not cost or time efficient, as it can take skilled engineers/operators several days to determine the root cause of a network issue. In present day telecommunications networks, the amount of data that can be gathered from these networks is tremendously large, and manual analysis of such data is limiting and time consuming.

To address these issues, the present disclosure includes a performance analysis system and method that provide an automated process for determining a root cause in the network. The present system and method utilizes an analytical workflow that guides users through the root cause analysis (RCA) process by performing automated analysis of key performance indicators (KPIs) and their components, and displaying the process on an intuitive graphical user interface that is user-friendly. It is to be understood that while the present disclosure relates to analysis in a telecommunications network, the system and method can be utilized to analyze other industry domains, such as, for example, finance, healthcare, and retail.

Figure 1:
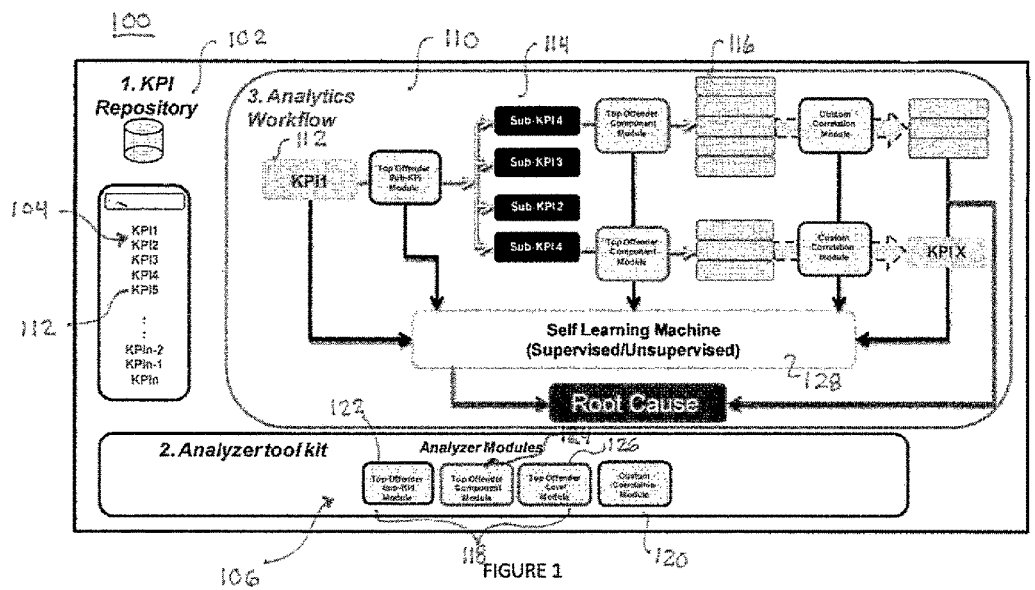
FIG. 1 is a system in accordance with the present disclosure.
Figure 2:
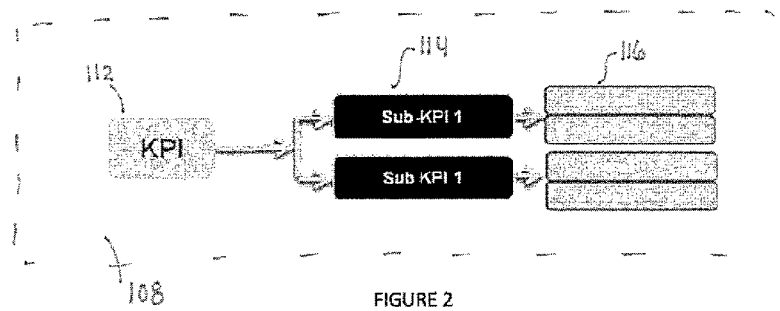
FIG. 2 is a diagram illustrating a KPI structure in accordance with an embodiment of the present disclosure.
Figure 3:
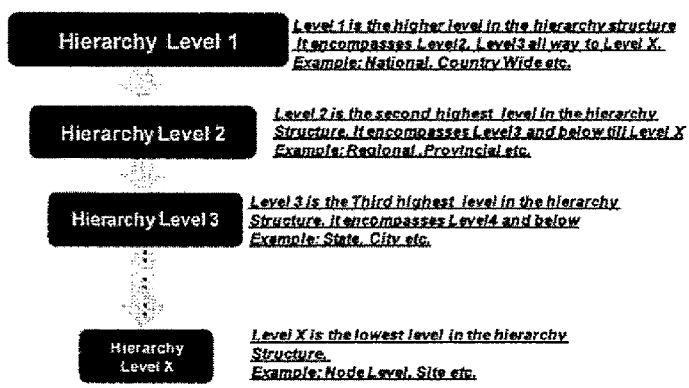
FIG. 3 is a diagram illustrating a KPI hierarchy in accordance with the present disclosure.

Referring now to FIGS. 1 to 3, a system 100 in a telecommunications network is provided and includes a database 102 including at least one metric 104. The database 102 can include a search function that efficiently enables users to select the at least one metric for analysis. The system 100 also includes at least one module 106 configured for analyzing the at least one metric. In addition, a graphical user interface (GUI) 108 (see FIGS. 2 and 5, for example) is provided and is configured for displaying the at least one metric 104 and module 106. A processor 110 is also included in the system 100 and is configured for determining a root cause in the network. As seen in FIG. 1, the at least one metric 104 includes at least one key performance indicator or KPI 112, which can include at least one sub-key performance indicator 114 and at least one component 116.

For graphical ease and simplicity, the at least one key performance indicator 112 is arranged in a hierarchical order or tree structure and displayed on the graphical user interface 108. When a user searches for a KPI 112 in the database 102 and "drops" the selected KPI onto the GUI, for example, the KPI's tree structure is displayed, revealing the logical constituents of the selected KPI. For example, and as shown in FIG. 2, an example KPI 112 tree structure is provided. The tree structure can include at least one sub-KPI 114 and at least one component 116. Such a tree structure clearly lays out the constituents of the KPI 112 to a user/operator and assists in their learning of the logical constituents of the KPI. By graphically displaying each of the constituents of the KPI 112 in the tree structure, the user can easily determine which KPI should be selected for the network analysis, as the constituents are visually laid out for the user, rather than a complicated formula, for example.

Turning to FIG. 3, the KPI 112 can have "x" hierarchy levels of aggregation, with level "1" being the highest, and level "x" being the lowest. Specifically, Level 1 could be a "national" level, with Level 2 being a "regional" level, Level 3 being a "state" level, and Level x being a "city" level. Level 1 would encompass Level 2, Level 3, all the way until Level "x". Similarly, Level 2 in the hierarchy would encompass Level 3 and all levels until Level "x". Level 3 would encompass all lower levels until Level "x", and so on until Level "x" is reached. During the methods described below, the processor analyzes the KPIs 112 (and their constituents) at each hierarchy level using the selected modules, for determining the root cause in the network. The user/operator can define at which hierarchy level the root cause analysis is to be completed, and can then search/analyze the KPIs 112 provided at that hierarchy level, for example.

Referring again to FIG. 1, the at least one module 106 can be part of an "analyzer tool kit", where the at least one module can include at least one of a top offender module 118 and a custom correlation module 120. Further, the top offender module 118 can include at least one of a top offender sub-key performance indicator module 122, a top offender component module 124, and a top offender level module 126, for example. Additional modules may also be possible, based on operator/user need. As will be described in further detail below, the top offender module 118 is configured to identify top offender sub-key performance indicators, components and levels. The custom correlation module 120 is configured to enable searching the database to add the at least one metric to the graphical user interface, and can be analyzed after the processor 110 has analyzed the top offender module 118. The processor 110 is configured to analyze the top offender module 118 and the custom correlation module 120 for determining the root cause in the network, which will be described in further detail below.

Figure 4:
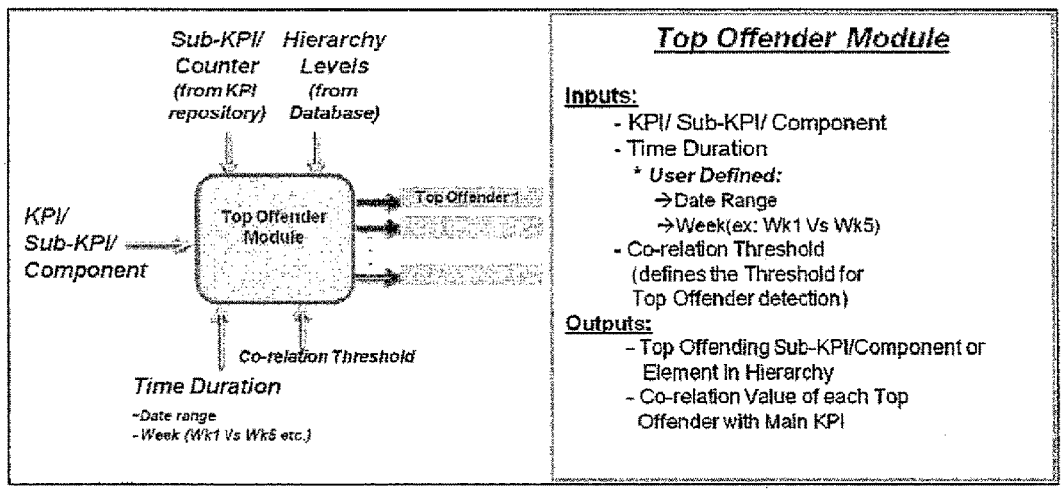
FIG. 4 is a diagram illustrating a module in accordance with an embodiment of the present disclosure.
Figure 5:
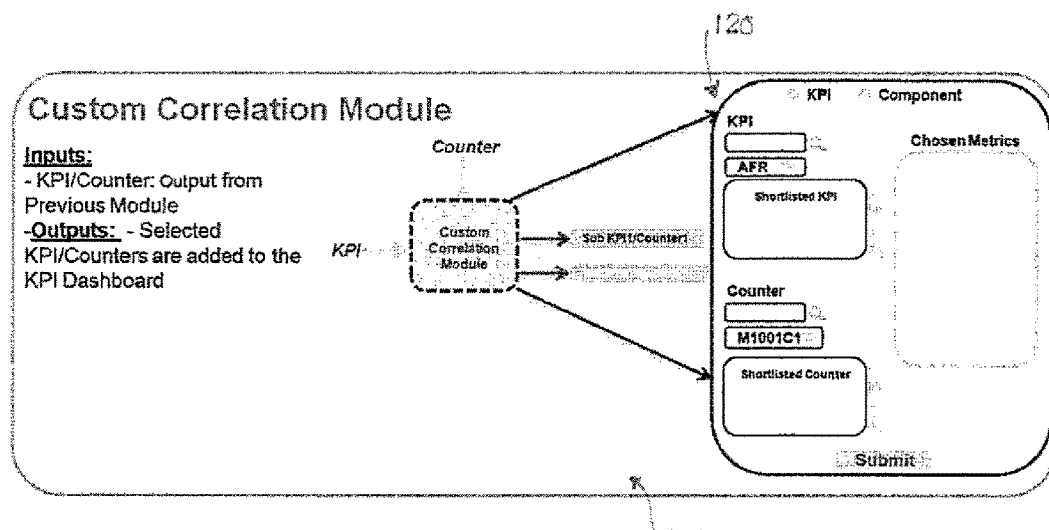
FIG. 5 is a diagram illustrating another module in accordance with an embodiment of the present disclosure.
Figure 6:
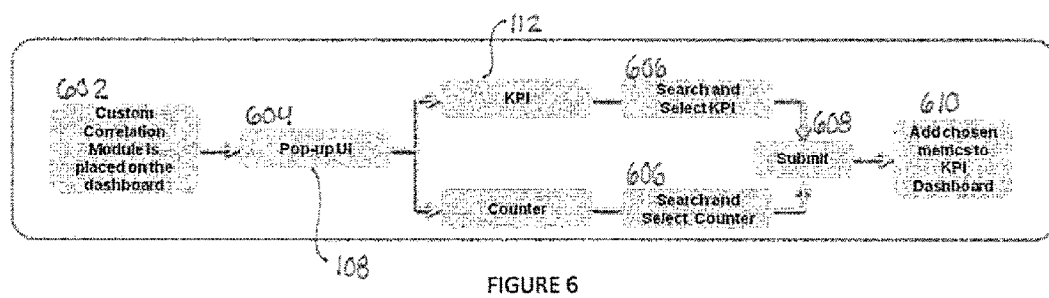
FIG. 6 is a flow chart illustrating a method for defining the module in FIG. 5 and in accordance with an embodiment of the present disclosure.

Turning now to FIGS. 4-6, the above identified modules will be described in further detail. FIG. 4 depicts an example top offender module 118. As will be described in further detail below, the processor 110 is configured to analyze the top offender module 118 by analyzing the selected KPIs 112, their sub-KPIs 114, and their components 116 to determine the root cause KPI component at the lowest hierarchical level, for example, Level "x" as described above with respect to FIG. 3. As shown in FIG. 4, various inputs are put into the top offender module 118 and analyzed; after the analysis is complete, the top offender module outputs, for example, a top offending sub-KPI or component in the hierarchy, and a co-relation value of each top offender with the selected KPI 112. The top offender module 118 is configured to analyze the KPI constituents and determine which of those constituents is causing the most impact on the network.

FIGS. 5 and 6 illustrate a custom correlation module 120 and a method for creating the module 120. The custom correlation module 120 can be utilized after the root cause and/or most impactful KPI has been determined from the analysis of the top offender module 118. The custom correlation module 120 allows a user to associate sub-KPIs 114 and components 116 from other KPIs 112 that have the same root cause as determined by the processor after analyzing the top offender module 118. The custom correlation module 120 is a customizable module that allows a user to build their own frameworks/dashboards on the graphical user interface using the KPIs 112. By analyzing various KPI 112 with the same root cause, the system 100 can derive a more precise root cause of network problems, as the system 100 is analyzing not only the selected KPI 112 and its constituents, but previously selected/analyzed KPIs 112 and their constituents. For example, as shown in FIG. 6, the user (or the processor) can input the KPI output from the top offender module 118, along with additionally selected KPI/sub-KPI/components (based on direct input or searching and then selection, for example), to create an analysis tree or hierarchical structure on the KPI dashboard on the GUI, as shown in FIG. 5. When the analysis is completed, the root cause of the network can be output by the processor 110.

More specifically, when utilizing the custom correlation module, for example, at 602 the module is placed onto the KPI dashboard/GUI, and a pop-up UI is prompted at 604, which enables selection of available KPI/Counters at 606. These selections are submitted at 608, and at 610, the selected metrics are added to the GUI of the custom correlation module 120 (see FIG. 5 for sample GUI of the module). It is contemplated that the custom correlation module 120 enables the system to provide a more accurate root cause analysis than previous systems that do not include previously analyzed KPIs in their determination of the root cause. The custom correlation module 120 is also advantageous because it allows users/operators to tailor the root cause analysis based on individual needs, and because it provide a GUI that is simple to use and understand.

The processor 110 is configured for analyzing the selected KPIs 112 and modules 106 using, for example, a self-learning machine 128 (see FIG. 1) provided within the processor 110 or as a separate component in communication with the processor. In other words, the processor 110, via the self-learning machine 128, can be configured to analyze the KPIs 112 and modules 106 using either an unsupervised learning approach or a supervised learning approach. In the unsupervised learning approach, the machine 128 can be configured (automatically or manually by the user/operator) to autonomously learn the relationships/associations between the KPIs 112, sub-KPI 114 and components 116. By utilizing the supervised learning approach, the machine 128 can be trained to utilize the analysis of the custom correlation module 120 as output data. After several training iterations, the processor 110, via the machine 128, can generalize the root cause based upon previous KPI and performance data collected from the network.

Figure 7:
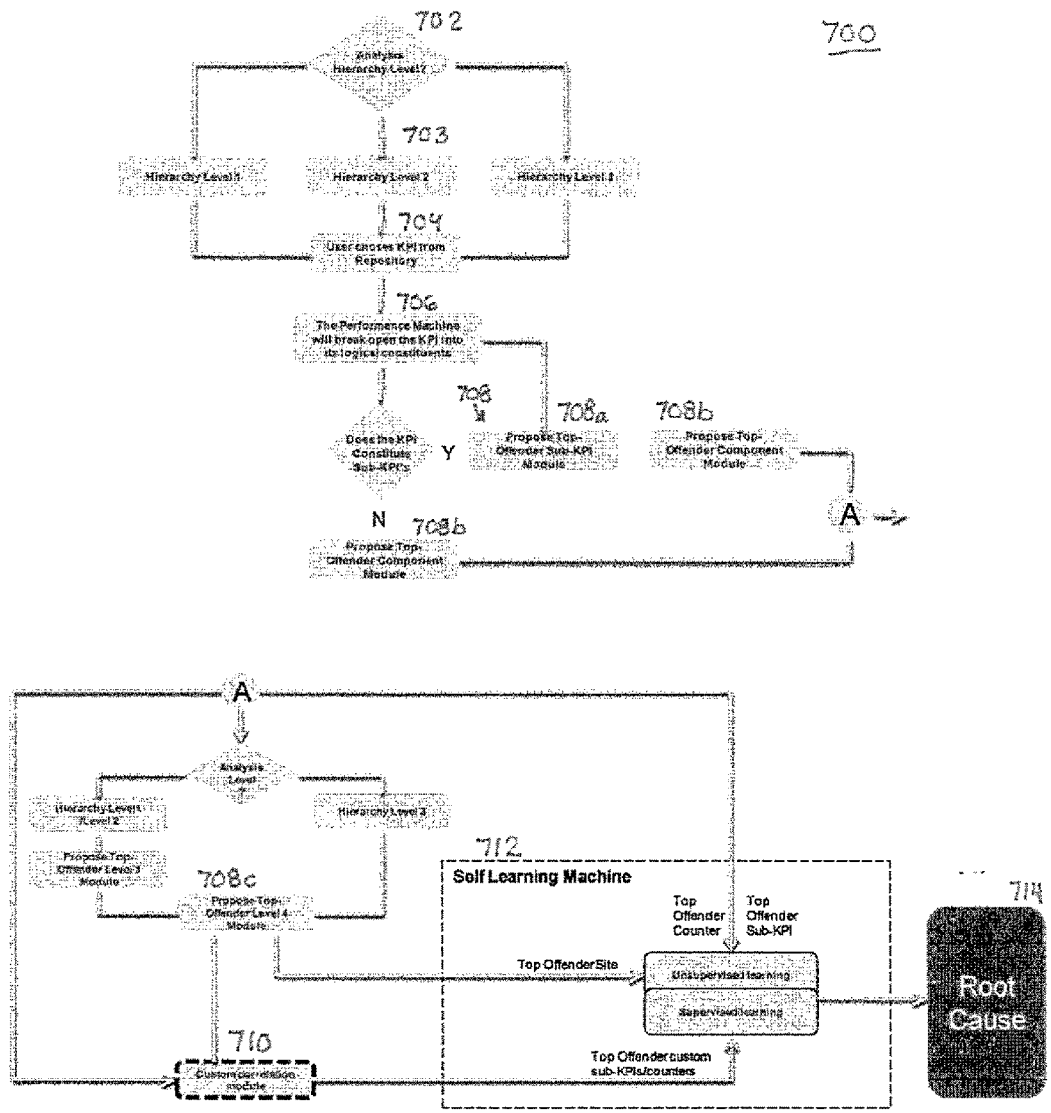
FIG. 7 is a flow chart illustrating a method in accordance with the present disclosure.
Figure 8:
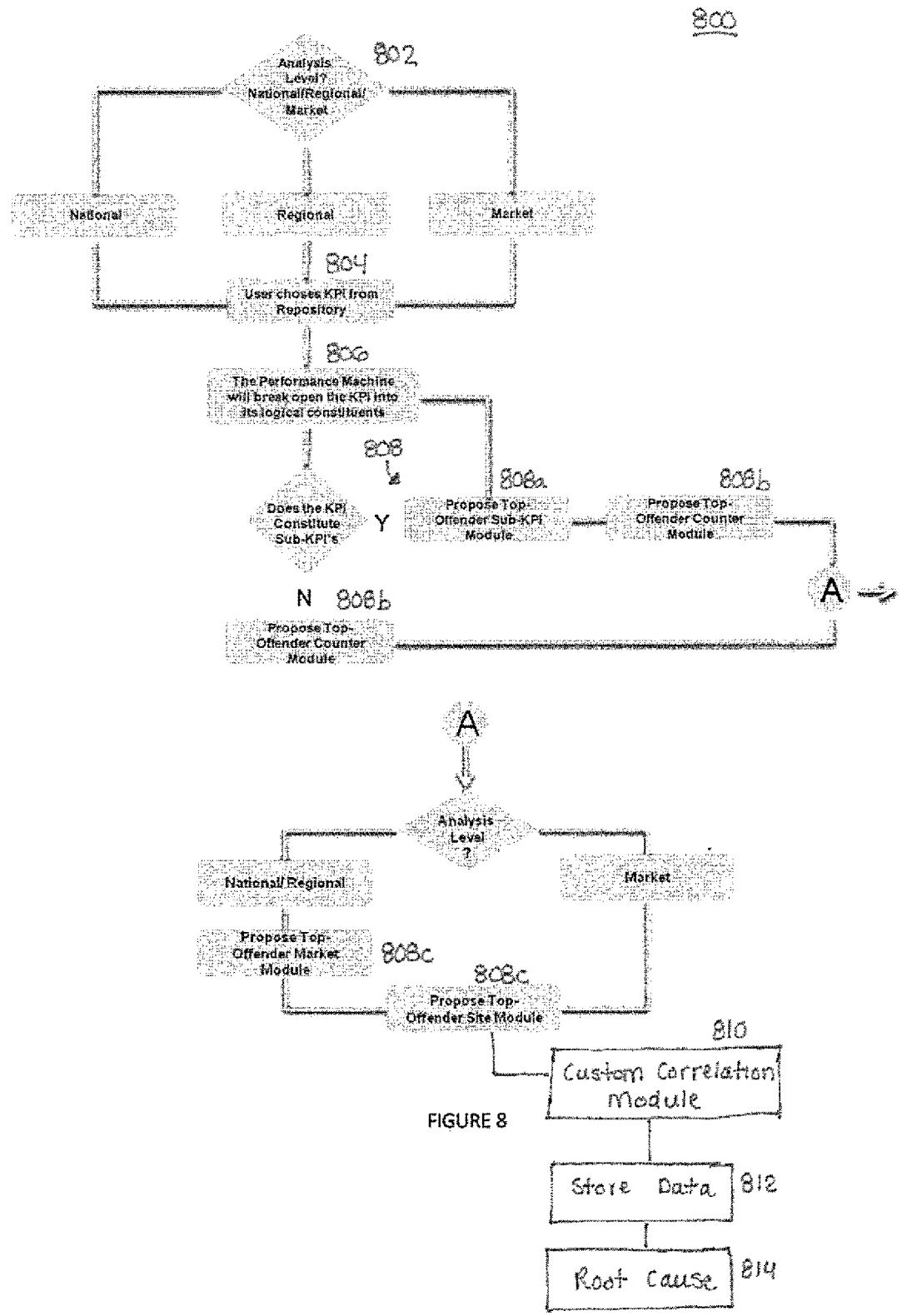
FIG. 8 is a flow chart illustrating another method in accordance with the present disclosure.

Turning now to FIG. 7, the system 100 provides a method 700 for analyzing network performance. The method 700 includes, at 702 defining, in a database, at least one metric. At 703, the method includes defining the hierarchy level of the analysis (i.e., Level 1, Level 2, Level 3, etc., as described above with respect to FIG. 3). At 704, at least one metric is selected from the database, either as a result of a search or by direct input by the user/operator, for example. At least one module is applied to the selected metric at 708. At 714, the processor generates a root cause in the network. Prior to the application of the at least one module, the method 700 can include, at 706, breaking the selected metric down into at least one sub-metric and at least one component. As described above, the metric/KPI 112 visually is broken down when it is dragged onto the GUI 108, thereby allowing the user/operator to easily see its constituents and confirm that the desired metric/KPI has been selected.

As described above with respect to FIGS. 1-6, the at least one module 106 includes at least one top offender module 118 and the custom correlation module 120. At 708, the at least one module is applied to the selected KPI/metric 112. Specifically, if the KPI 112 includes sub-KPI 114, then the method 700 will apply the top offender sub-KPI module 122 at step 708a. If the KPI 112 does not include any sub-KPI 114, it is determined if the selected KPI 112 includes components 116. If yes, then the method 700 moves to 708b, where the top offender component module 124 analyzes the components 116 of the selected KPI 112. This same process of steps 708, 708a, 708b continues until each sub-KPI 114 and/or component 116 of the selected KPI 112 has been analyzed by the processor 110. At 708c, the top offender level module 126 analyzes the hierarchy level of the selected KPI 112.

When the processor 110 has analyzed, at steps 708a-c, the various top offender modules, the processor, at 710, utilizes the custom correlation module 120 to further determine the root cause of the network. As described above, with the custom correlation module 120, the user/operator can add additional metrics/KPI to the GUI/dashboard for analysis, as well as add previously collected KPI data to the GUI, for example, to further enhance the RCA. At 714, based on the analyses of the top offender modules 118 and the custom correlation module 120, the processor 110 generates the root cause in the network. The method 700 can optionally include, at 712, sending the root cause determined by the top offender modules 118 and the custom correlation module 120 to the self-learning machine 128. As described above, the machine 128 can utilize either an unsupervised learning approach or a supervised learning approach to determine the root cause in the network and provide the root cause to the processor, which, at 714, will generate the root cause to the user/operator on the GUI, for example. As mentioned above, the self-learning machine 128 can be an optional part of the processor 110, and is configured for learning from each root cause analysis and for aiding in future root cause analyses. The self learning machine 128 is configured to reduce repetitive analyses of the same KPI/hierarchy level/modules, thereby increasing the efficiency of the RCA.

FIGS. 8-12 provide a more specific use-case method 800 utilizing the present system 100. The method 800 includes, at 802, defining a hierarchy level for the method. Specifically, at 802 the user/operator determines at which hierarchy level (i.e., National, Regional, Market) to proceed with the method/analysis. At 804, the method includes selecting a metric from a metric repository. At 806, components of the selected metric are identified (see FIG. 9). The at least one module is applied to the components of the selected metric at 808. At 812, data from the at least one module is stored in a memory of the processor. At 814, the processor generates a root cause in the network, based on the stored data.

Specifically, and similar to the method 700, if the KPI 112 includes sub-KPI 114, then the method 800 will apply the top offender sub-KPI module 122 at step 808a. If the KPI 112 does not include any sub-KPI 114, it is determined if the selected KPI 112 includes components 116. If yes, then the method 800 moves to 808b, where the top offender component module 124 analyzes the components 116 of the selected KPI 112. This same process of steps 808, 808a, 808b continues until each sub-KPI 114 and/or component 116 of the selected KPI 112 has been analyzed by the processor 110. At 808c, the top offender level module 126 (also known as the top offender site module or the top offender market module, depending on the hierarchical level of the analysis) analyzes the hierarchy level of the selected KPI 112.

Figure 9:
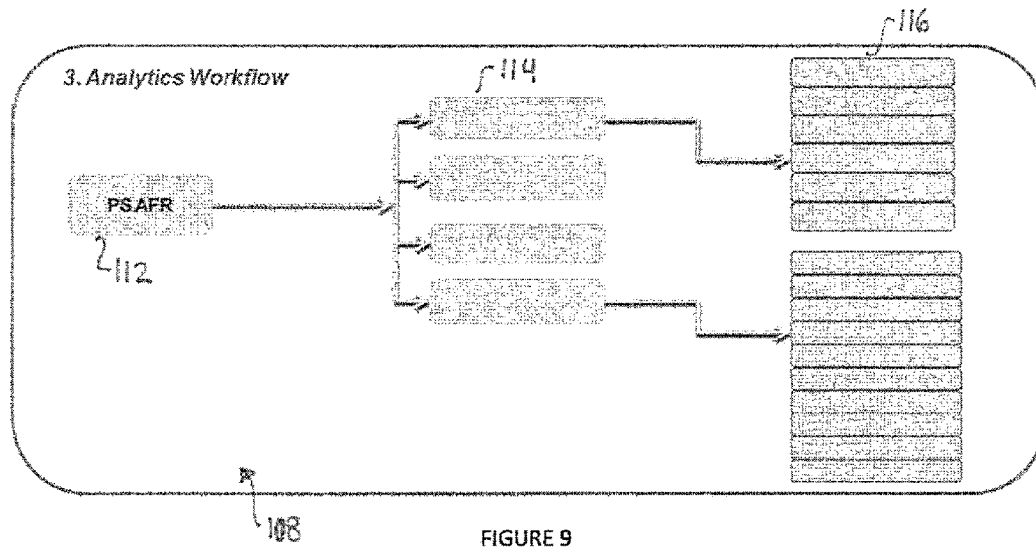
FIG. 9 is an example graphical user interface in accordance with the present disclosure.
Figure 10:
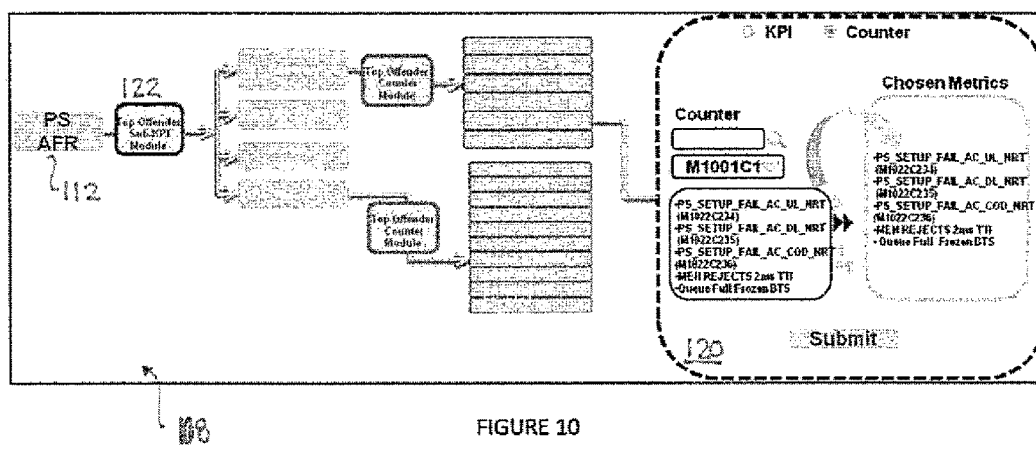
FIG. 10 is an example graphical user interface of a module in accordance with the present disclosure.
Figure 11:
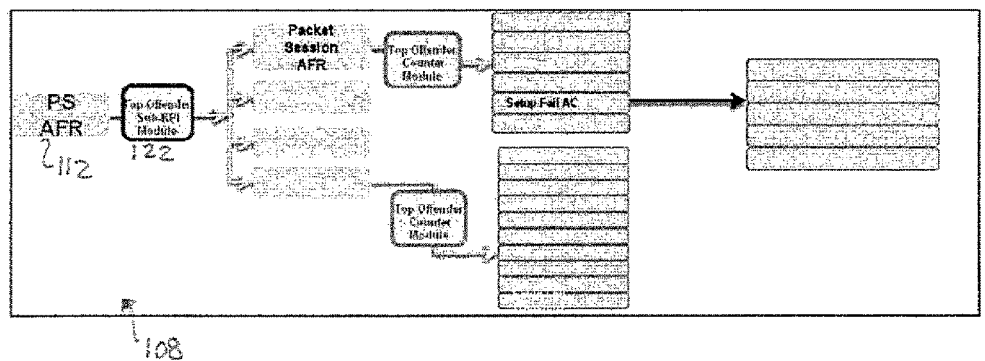
FIG. 11 is another example graphical user interface of a module in accordance with the present disclosure.

When the processor 110 has analyzed, at steps 808a-c, the various top offender modules, the processor, at 810, utilizes the custom correlation module 120 to further determine the root cause of the network. The custom correlation module 120 is configured to define additional metrics from the metric repository and arrange the additional metrics into a hierarchical tree structure including any sub-KPI 114 and components 116 of the KPI 112 (as shown in FIG. 9). For example, and as shown in FIG. 10, the custom correlation module can be used to add additional KPIs 112 to the KPI tree to further refine the root cause analysis, based on user preference (see the "Chosen Metrics" table in FIG. 10). To add these KPIs 112 to the dashboard/GUI 108, the user can search for and choose the desired KPI. FIG. 11 illustrates the graphical user interface 108 displayed after these selected KPIs are added to the tree structure. The method 800 can then apply the top offender counter module to analyze the components 116 that were added to the tree structure, to determine the root cause in the network, as shown in FIG. 12, where it is indicated in this example that the root cause can be found in the Packet Session AFR KPI, and more specifically that these failures were caused by admission control (AC) reasons, with the Queue Full/Frozen Base Transceiver Station (BTS) being the primary cause of the AC issues.

The method 800 can optionally include the processor analyzing the selected metric, the at least one module, and prior selected metrics and modules from previously completed network analyses utilizing the method. For example, the processor 110, via the self-learning machine 128 described above, can be configured to build intrinsic models illustrating the relationships/associations between the KPIs 112, sub-KPI 114 and components 116 from previous analyses and use that information to determine the root cause in the network with respect to the information in the presently selected KPI. With the root cause identified, the present system 100, and methods 700, 800 are configured to drive optimization for the telecommunications network based on the root cause generated by the processor 110.

Figure 12:
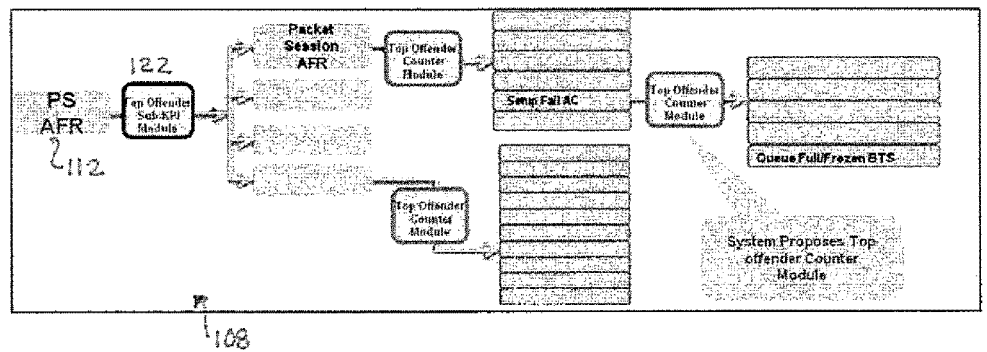
FIG. 12 is yet another example graphical user interface of a module in accordance with the present disclosure.

The method can further include displaying, on the graphical user interface of the processor, the components of the selected metric, as shown in FIGS. 2 and 10-12 of the present disclosure. It is further contemplated that the method 800 can include displaying, on the graphical user interface of the processor, the root cause generated by the processor (FIG. 12).

The present disclosure provides an automated, machine-learning approach for determining the root cause problem in a network. The present method can be utilized in, for example, network performance trend analysis, network performance gain quantification, performance troubleshooting, network capacity analysis, and network benchmarking, although it is to be understood that this list is not exhaustive and the present method and system can be utilized in various other areas in telecommunication networks, as well as in other fields that rely on network/performance quality. The presently described methods provide an efficient and user-friendly manner for breaking down KPIs into their sub-KPIs and components, and arranging these KPIs into tree structures that are searchable and easily manipulated on a graphical user interface. The present disclosure also provides top offender modules for analyzing sub-KPIs and components on a hierarchical level, enabling a deeper and more detailed framework for determining the root cause in the network. The present disclosure further provides custom correlation modules to analyze additional sub-KPIs and components for determining the root cause in the network. A processor with self-learning capabilities is also provided in the present disclosure, enabling the processor to learn, over various iterations, root causes in the network based on present and past KPI analyses. It is further contemplated that the present system and method can be integrated into a telecommunications network without substantial changes to existing network components or infrastructure.

Embodiments of the present disclosure may be implemented in software (executed by one or more processors), hardware (e.g., an application specific integrated circuit), or a combination of software and hardware. In an example embodiment, the software (e.g., application logic, an instruction set) is maintained on any one of various conventional non-transitory computer-readable media. In the context of this document, a "non-transitory computer-readable medium" may be any media or means that can contain, store, communicate, propagate or transport the instructions for use by or in connection with an instruction execution system, apparatus, or device, such as a computer. A non-transitory computer-readable medium may comprise a computer-readable storage medium (e.g., memory or other device) that may be any media or means that can contain or store the instructions for use by or in connection with an instruction execution system, apparatus, or device, such as a computer. As such, the present disclosure includes a computer program product comprising a computer-readable storage medium bearing computer program code embodied therein for use with a computer, the computer program code comprising code for performing any of the methods and variations thereof as previously described. Further, the present disclosure also includes an apparatus which comprises one or more processors, and one or more memories including computer program code, wherein the one or more memories and the computer program code are configured, with the one or more processors, to cause the apparatus to perform any of the methods and variations thereof as previously described.

If desired, the different functions discussed herein may be performed in a different order and/or concurrently with each other. Furthermore, if desired, one or more of the above-described functions may be optional or may be combined.

Although various aspects of the disclosure are set out in the independent claims, other aspects of the disclosure comprise other combinations of features from the described embodiments and/or the dependent claims with the features of the independent claims, and not solely the combinations explicitly set out in the claims.

It is also noted herein that while the above describes example embodiments of the disclosure, these descriptions should not be viewed in a limiting sense. Rather, there are several variations and modifications which may be made without departing from the scope of the present invention as defined in the appended claims.

One having ordinary skill in the art will readily understand that the invention as discussed above may be practiced with steps in a different order, and/or with hardware elements in configurations which are different than those which are disclosed. Therefore, although the disclosure has been described based upon these preferred embodiments, it would be apparent to those of skill in the art that certain modifications, variations, and alternative constructions would be apparent, while remaining within the spirit and scope of the invention. In order to determine the metes and bounds of the disclosure, therefore, reference should be made to the appended claims.

The following abbreviations that may be found in the specification and/or the drawing figures are defined as follows:

AC Admission Control
AFR Access Failure Metric
GUI Graphical User Interface
KPI Key Performance Indicator
RCA Root Cause Analysis

The invention claimed is:

1. A system in a telecommunications network comprising:
    at least one processor; and
    at least one memory including computer program code,
    wherein the at least one memory and the computer program code are configured to, with the at least one processor, cause the system at least to:
        select at least one metric for analysis:
        implement a top offender module to analyze the selected metric;
        implement a custom correlation module to generate a custom dashboard that adds at least one custom metric for analysis after the selected metric has been analyzed;
        display, via a graphical user interface, the top offender module and the custom correlation module;
        determine a root cause in the network based on the analysis of the top offender module and the analysis of the custom correlation module.

2. The system of claim 1 wherein the at least one metric includes at least one key performance indicator,
    wherein the at least one key performance indicator includes at least one sub-key performance indicator and at least one component; and
    wherein the at least one key performance indicator is arranged in a hierarchical order.

3. The system of claim 1 wherein the top offender module includes at least one of a top offender sub-key performance indicator module, a top offender component module, a top offender level module, and a top offender counter module.

4. The system of claim 3 wherein the top offender module is configured to identify top offender sub-key performance indicators, components and levels.

5. The system of claim 1 wherein the processor is further configured to analyze the top offender module for determining the root cause.

6. The system of claim 1 wherein the processor is further configured to analyze the custom correlation module for determining the root cause.

7. A method in a telecommunications network comprising:
defining, in a database by a processor, at least one metric;
selecting, with the processor, at least one metric from the database;
applying, by the processor, a top offender module to analyze the selected metric;
applying, by the processor, a custom correlation module to generate a custom dashboard that adds at least one custom metric for analysis after the selected metric has been analyzed; and
generating, from a processor, a root cause in the network based on the analysis of the top offender module and the analysis of the custom correlation module.

8. The method of claim 7 including defining a hierarchy of the at least one metric.

9. The method of claim 7 including analyzing, at the processor, the at least one module.

10. The method of claim 7 wherein generating, from a processor, a root cause in the network includes utilizing a self-learning machine configured for generating the root cause based on previous analyses of the at least one module.

11. A method in a telecommunications network having a processor, comprising:
defining, by the processor, a hierarchy level of the method;
selecting, by the processor, a metric from a metric repository at the selected hierarchy level;
identifying, by the processor, components of the selected metric;
applying, by the processor, at least one module to the components of the selected metric;
storing, by the processor, data from the at least one module in a memory of the processor; and
generating, at the processor, a root cause based on the stored data,
wherein generating a root cause based on the stored data includes the processor analyzing the selected metric, the at least one module, and prior selected metrics and modules from previously completed network analyses utilizing the method.

12. The method of claim 11 including defining by the processor, at the at least one module, additional metrics from the metric repository; and arranging, by the processor, the additional metrics in a hierarchical structure.

13. The method of claim 12 wherein the at least one module includes a custom correlation module, and wherein the custom correlation module defines the additional metrics from the metric repository and arranges the additional metrics in a hierarchical structure.

14. The method of claim 11 further including creating, at the processor, a hierarchical structure including the selected metric, at least one sub-metric of the selected metric, and at least one component of the selected metric.

15. The method of claim 11 further including creating, at the processor, at least one hierarchical structure by utilizing a custom correlation module to connect the selected metric with at least one additional metric.

16. The method of claim 11 further including storing, at a self learning machine in the processor, root cause analyses of previously selected metrics, for aiding in future root cause analysis.

17. The method of claim 11 including driving, by the processor, optimization for the telecommunications network based on the root cause generated by the processor.

* * * * *